US008683445B2

(12) United States Patent  
Abraham et al.

(10) Patent No.: US 8,683,445 B2  
(45) Date of Patent: Mar. 25, 2014

(54) USER-INTERFACE TESTING

(75) Inventors: Tal Abraham, Rehovot (IL); Eran Kaufman, Azor (IL); Ilan Meirman, Petah-Tikwa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 761 days.

(21) Appl. No.: 12/607,781

(22) Filed: Oct. 28, 2009

(65) Prior Publication Data

US 2011/0099491 A1    Apr. 28, 2011

(51) Int. Cl.
*G06F 9/44*    (2006.01)

(52) U.S. Cl.
USPC .......................................... 717/125; 715/764

(58) Field of Classification Search
None
See application file for complete search history.

(56) References Cited

U.S. PATENT DOCUMENTS

| | | | |
|---|---|---|---|
| 5,596,714 A * | 1/1997 | Connell | 714/38.1 |
| 5,600,789 A | 2/1997 | Parker et al. | |
| 5,634,002 A | 5/1997 | Polk et al. | |
| 5,781,720 A | 7/1998 | Parker et al. | |
| 6,182,116 B1 * | 1/2001 | Namma et al. | 709/204 |
| 6,622,298 B1 | 9/2003 | Stamm | |
| 2008/0126955 A1 * | 5/2008 | Takatoshi | 715/762 |
| 2008/0270942 A1 * | 10/2008 | Petersen et al. | 715/840 |
| 2009/0079663 A1 * | 3/2009 | Chang et al. | 345/1.2 |
| 2011/0258213 A1 * | 10/2011 | Pollara | 707/765 |

\* cited by examiner

*Primary Examiner* — Elias Mamo

(57) ABSTRACT

A user-interface testing process involves generating plural display-data representations of a common subject for plural respective user-interface instances. The resulting display data is tracked for each of the application user-interface instances so as to generate respective object-level descriptions of the user interface instances. The object-level descriptions are compared to detect differences between the application user-interface instances.

20 Claims, 3 Drawing Sheets

USER-INTERFACE TESTING

BACKGROUND

Herein, related art is described for expository purposes. Related art labeled "prior art", if any, is admitted prior art; related art not labeled "prior art" is not admitted prior art.

Testing of computer applications can be challenging not only because the applications are complex, but because they have to be compatible with a range of possible computer environments. A "desktop" application will typically rely on an underlying operating system for elements of its user interface; operating system differences (e.g., between Windows 7, Windows Vista, and Windows XP) can yield user interface differences that may or may not be acceptable. Likewise, a web application will typically rely on a browser (e.g., Microsoft Internet Explorer, Mozilla Firefox, Google Chrome) for rendering elements of its user interface; different browsers may cause differences in the way the user interfaces are presented. Detecting differences in a user interface across different application environments can be difficult; also, the performance of a human involved in the process can deteriorate due to tedium and fatigue.

DETAILED DESCRIPTION

Figure 1:
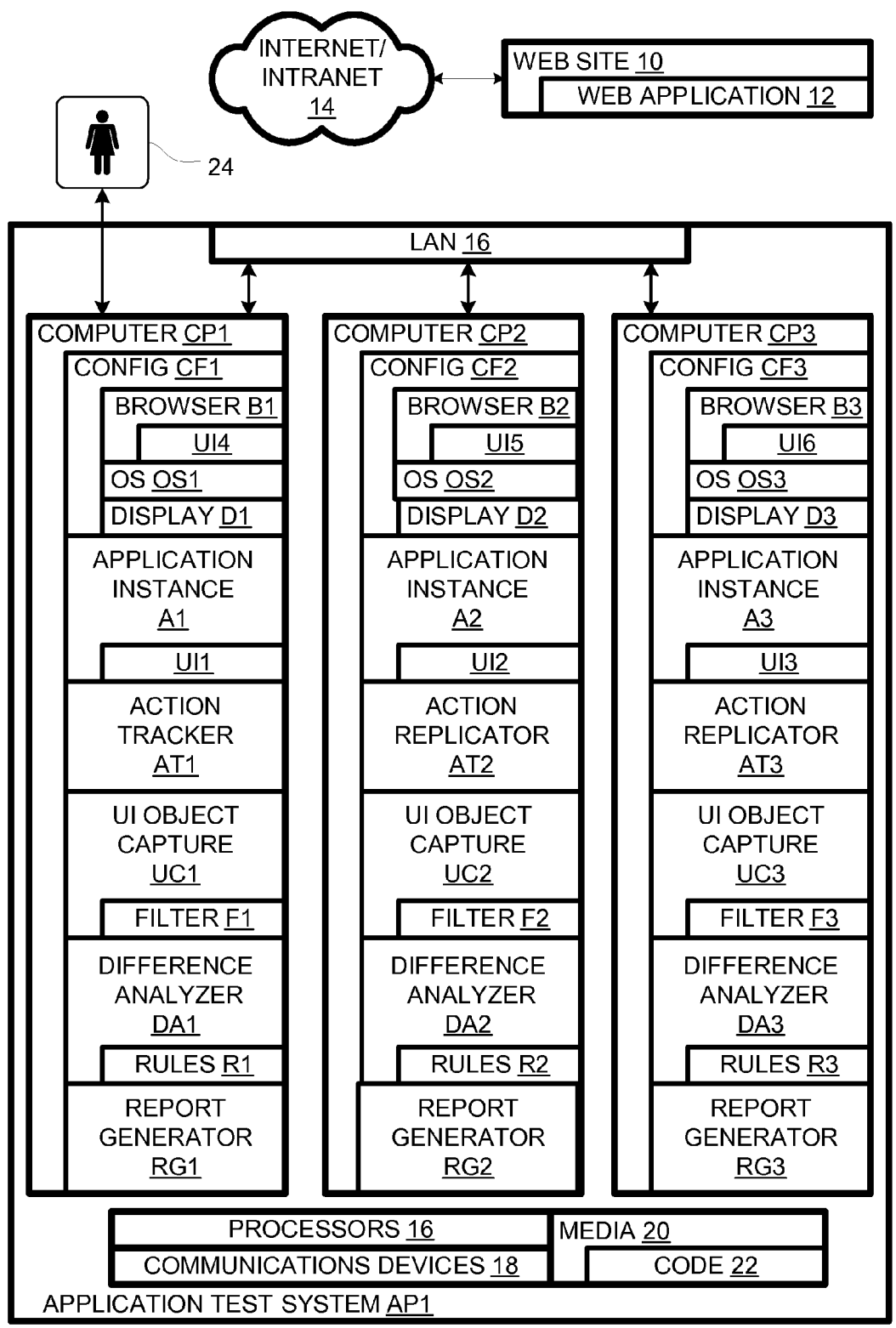
FIG. 1 is a schematic diagram of a system for testing applications.

Plural display-data representations of a common subject, e.g., a dialog box of an application or a web page, are generated under different conditions, e.g., using different operating systems or browsers. Object-level descriptions are captured for each representation and then compared to detect differences in the user interfaces. The differences can be presented to the user, reducing the burden on a human tester to detect differences in bit-mapped displays.

Application test system AP1 is shown connected to a website 10 for running a web application 12 that can be accessed via the Internet/Intranet (either or both, depending on the embodiment) 14. Application test system AP1 includes processors 16, communications devices 18, and computer-readable media 20 for storing code 22. Likewise, web site 10 includes processors, communications devices, and media storing code, e.g., web application 12.

Application test system AP1 comprises computers CP1, CP2, and CP3, which communicate with each other via a local-area network 16. In alternative embodiments, the computers communicate over wide-area networks (WANs) or a combination LANs and WANs. In various embodiments, the computers can be hardware computers, blades, hardware partitions, virtual partitions, or virtual machines. For example, a mainframe computer can be divided into hardware partitions, each of which functions as a computer in its own right running its own applications and instance of an operating system.

Computers CP1, CP2, CP3 have respective hardware and software configurations CF1, CF2, and CF3. For example, computers CP1, CP2, and CP3 can have different displays D1, D2, and D3 (e.g., with different resolutions, aspect ratios, refresh rates, and color depths), different operating systems OS1, OS2, and OS3, and different browsers B1, B2, and B3. In alternative embodiments, not all of these elements differ among systems; in further embodiments, other differences exist that can impact application user interfaces. Also, the number of computers, application instances, and user interfaces involved, can vary among embodiments.

Application instances A1, A2, and A3 are respectively installed on computers CP1, CP2, and CP3. In the illustrated embodiment, the application instances are identical so that compatibility with respective configurations CF1, CF2, and CF3 can be tested. In other embodiments, the application instances can differ in version and/or configuration so that the effects of the different versions or application configurations can be tested. Each application instance A1, A2, A3, has a respective user interface instance UI1, UI2, UI3. In the session of FIG. 1, a user 24 interacts directly with application instance A1, but no user interacts directly with application instances A2 and A3.

Hardware and software system AP1 hosts test-specific software on each computer running an instance of the application under test. Computer CP1 hosts action tracker/replicator AT1, user-interface object capturer UC1, difference analyzer DA1, and report generator RP1. Computer CP2 hosts action tracker/replicator AT2, user-interface object capturer UC2, difference analyzer DA2, and report generator RP2. Computer CP3 hosts action tracker/replicator AT3, user-interface object capturer UC3, difference analyzer DA3, and report generator RP3. User-interface object capturers UC1, UC2, and UC3 respectively include filters F1, F2, and F3 for filtering out "uninteresting" object information. Difference analyzers DA1, DA2, and DA3, respectively include rules R1, R2, and R3 that distinguish between "interesting" and "uninteresting" differences.

On a superficial level, a user is interacting with a bit-mapped display by controlling one or more hardware devices such as a keyboard, mouse, trackball, touch screen, voice input, etc., and the bit-mapped display changes in response. However, on a program level, the interaction is defined by program objects, relations between program objects, attributes of program objects, and actions defined for the program objects. For example, one type of program object is a radio button; activating a radio button, e.g., by clicking on it, can toggle the radio button between an "on" condition (in which a dot appears in a circle) and an "off" condition (in which the dot disappears).

Action tracker/replicators AT1, AT2, and AT3 can operate either in tracker mode or replicator mode. Typically, one tracker/replicator tracks a user's actions and communicates object-level descriptions of them over LAN 16 to the other tracker/replicators, which replicate the actions to the other application instances. Allowing each tracker/replicator to work in either mode allows a user to work with any computer or any application instance directly and still test all application instances. In an alternative embodiment, one computer hosts a non-replicating tracker and other computers host non-tracking replicators. In other embodiments, comparable actions are applied across computers to generate corresponding representations of a subject without using such tracking and replicating.

Figure 2:
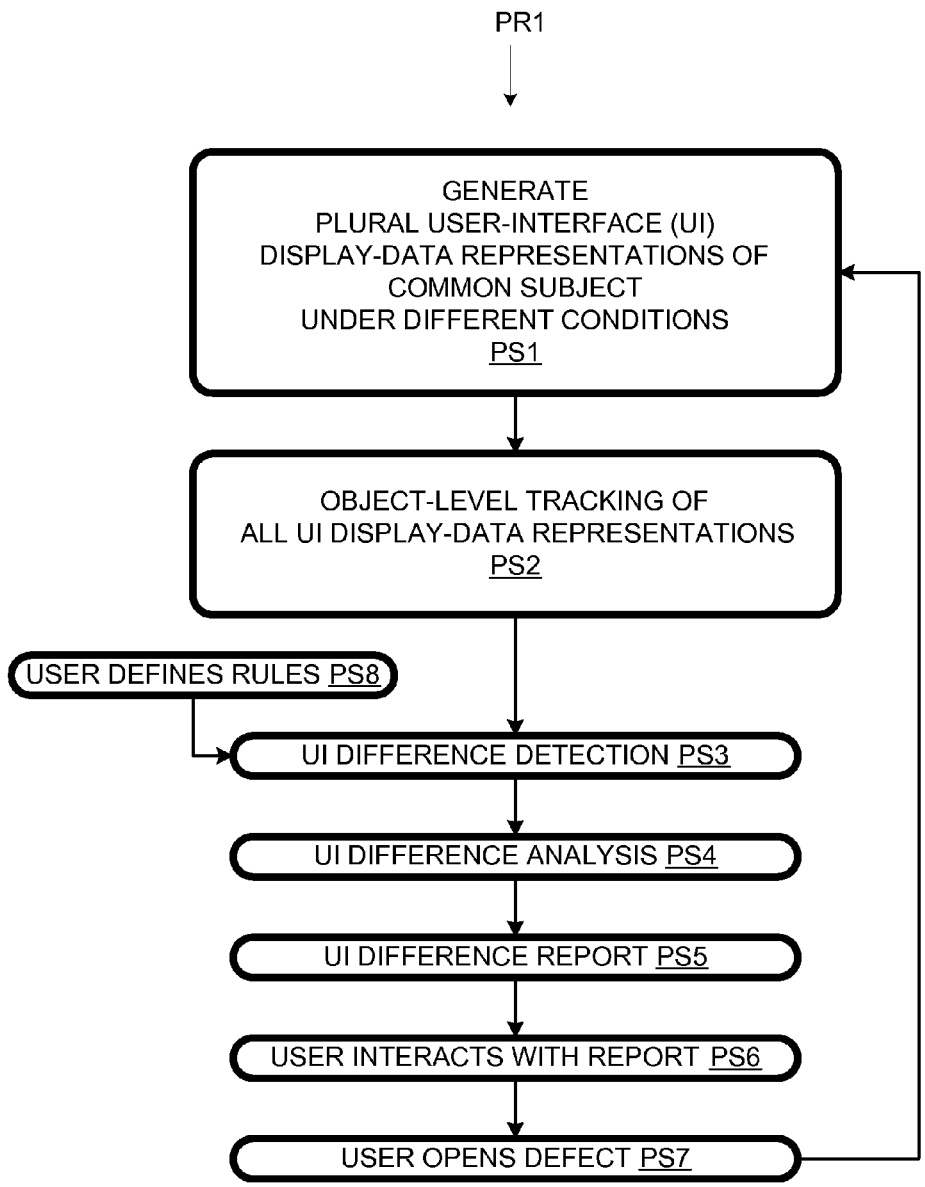
FIG. 2 is a flow chart of a process for testing applications as implemented on the system of FIG. 1.

A process PR1 implemented on system AP1 is flow charted in FIG. 2. A segment PS1 provides for generating plural display-data representations of a common subject for plural respective user-interface instances. For example, the common subject can be the contents of a dialog box or other window associated with a local application reached through a common set of user interactions with the application using computers with different hardware and software configurations. For another example, the common subject can be a page of a website viewed through different browsers.

The different representations can be generated in a variety of ways. For example, a user interacting with a single computer can view a website at different times using different browsers. A user can sequentially interact with different instances of a local application on different computers, e.g., running different operating systems. Multiple users can interact with the plural computers so that the representations can be generated concurrently. Alternatively, the multiple users can be simulated by a single user remotely controlling computers from a remote management station. Note that, in approaches that use unattended computers, the display data can be generated even if they are not used to produce and actual human-readable output (e.g., on a monitor); also, the unattended computers can conveniently be partitions of a mainframe or blades of a blade system.

In the illustrated embodiment, a user interacts using one computer, while action replicating software replicates the actions on other computers. For example, application tracker/replicator AT1 can track the actions on objects that user 24 applies to user interface UI1 of application instance A1. As there is no user for application instances A2 or A3, user actions are not tracked for these instances. The tracking results in object-level descriptions of user actions, which are communicated to other tracker/replicators, e.g., the descriptions captured by tracker replicator AT1, are communicated to tracker/replicators AT2 and AT3.

The "other" tracker/replicators replicate the user's actions, effectively simulating the user's actions to their respective application instances. For example, tracker/replicators AT2 and AT3 effectively apply user 24 actions to application instances A2 and A3. Thus, all application instances A1-A3 encounter the same user actions. Since application instances A1-A3 are identical, differences in the way they respond to these actions can be attributed to the respective configurations CF1-CF3 of the respective computers CP1-CP3.

At process segment PS2, object-level descriptions of all displays (presentations) are captured for all application instances being tested. For example, the objects displayed, their dimensions and positions, their colors, associated text, etc., are listed for each application instance. Not all object data affects the display; for example, object identifiers may not affect what is displayed. Accordingly, respective filters F1, F2, and F3, detect and omit from the descriptions such superfluous (for present purposes) data. The captured descriptions are gathered over LAN 16 on the computer (e.g., CP1) at which the user (e.g., user 24) is stationed.

At process segment PS3, display descriptions are compared across application instances and differences are detected, e.g., by difference analyzer DA1. Note that only one of difference analyzers DA1-DA3 is used; the others are hosted so that the user can select which computer and which application instance to interact with directly. Difference analyzer analyzes the differences at process segment PS4. In doing so, it can apply rules to filter uninteresting differences. For example, it may not be significant that an object's position differs by one or two pixels between application instances. Rules, e.g., rules R1, can specify which differences can be ignored.

Difference analyzer DA1 has the ability to detect systematic differences between presentations. For example, if all buttons for application instance A1 are displaced two pixels to the left relative to their counterparts in application instance A2, difference analyzer DA1 can determine this and report the differences in summary fashion rather than repeat the discrepancy for each object.

At process segment PS5, a user-interface difference report is generated and displayed (e.g., by report generator RP1) to the user. The report can include a list of differences between a pair of application instances. Systematic differences detected by the difference analyzer can be presented in summary fashion. In an alternative embodiment, a report can display corresponding representations of more than two application instances, e.g., provide for a three-way comparison.

Figure 3:
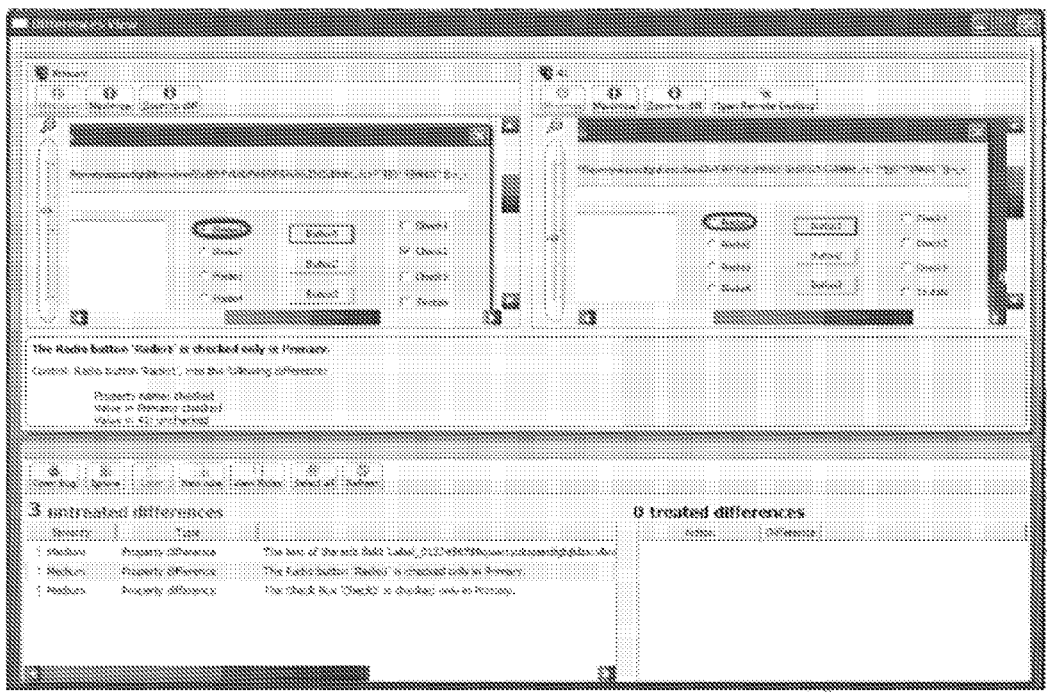
FIG. 3 is a screenshot of a difference report of a system for testing applications.

At process segment PS6, the user can interact with the report, clicking on a listed difference to see it highlighted in a pair of screen shots as shown in FIG. 3. In this case, in one application instance, a radio button is indicated as "on", while the counterpart for the other application instance is indicated as "off". The user can select which defects are highlighted, which frames in a series of presentations are viewed, and which pairs of application instances are being compared.

In the course of interacting with the report, a user can "open" a defect on a difference at process segment PS7. Once the system shows a difference, and the user ensures it represents a real defect, the user can hit the "open defect" button. The system then creates a defect record in the "defect tracking system" that is pre-filled with information. The defect record describes the difference; in addition, a screenshot showing the two screens (like the top part of FIG. 3) is attached to the defect. In this way, the user can readily detect and characterize defects.

Figure 4:
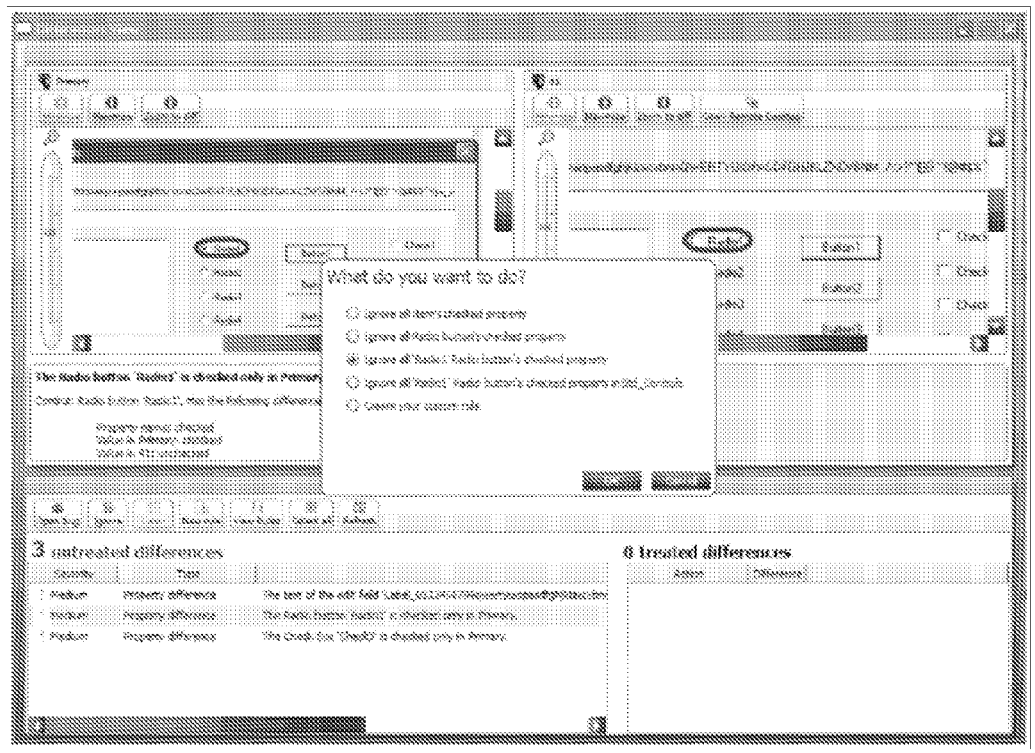
FIG. 4 is a screenshot of a difference report of a system for testing applications including a dialog box.

Some differences may be of interest while others may not. At process segment PS8, the report gives users an option to indicate that reported differences can be ignored, in which case, they can be removed from the report. Process segment PS8 can be performed in conjunction with process segments PS6 and PS7 and it can also be performed prior to a test run. For example, at process segment PS8, a user can add new user-defined rules and/or modify or delete default rules, e.g., by clicking on the "new rule" button of FIG. 3 so as to bring up the dialog box of FIG. 4. In general, the rules (R1-R3) which specify which differences should be omitted from a report can be classified as built-in or user defined. The built-in rules can be fixed or default.

More sophisticated rule control is provided by a rule manager and an associated wizard; these permit complex rules, e.g., using Boolean expressions. For example, a complex rule can call for ignoring the color and size of buttons if their names start with "ABC" only if they reside in a window that is titled "Page 1" and its horizontal size is less than 400 pixels. Rules can call for ignoring differences such as the presence or absence of tabs, which might simply indicate the difference between a tabbed interface (Internet Explorer 7) and a non-tabbed interface (Internet Explorer 6). Also, certain areas, such as toolbars can be specified for omission from comparative reports.

The foregoing discussion has focused on testing a given application in the context of different computer configurations. System AP1 and process PR1 can also be used to test a web application as accessed by different browsers. For example, user 24 can access web application 12 via Microsoft Internet Explorer 7, while replicators AT2 and AT3 cause web application 12 to be accessed by different browsers B1, B2, and B3, respectively, e.g., via Google Chrome and Mozilla Firefox. In this case, comparisons and differences relates to the user interfaces UI4, UI5, and UI6, respectively. Action tracking and difference analysis and reporting can proceed as described as above.

Herein, "system" refers to any set of interacting elements and their interactions; by way of example and not of limitation, the elements can be mechanical components, process steps or segments, atoms, or program instructions. Herein, a "computer" is a physical or virtual machine (defined by software running on hardware) that manipulates physical analogs of data in accordance with physical analogs of program instructions. Herein, "object-level" refers to descriptions relating to an object-oriented programming language, e.g., in terms of objects, object relations, object dimensions, object positions, object-defined actions and responses, and object attributes; a description of a presentation may be "object-level" has opposed to "bit-mapped" and an object-level description of actions can be opposed to descriptions of physical actions on hardware. The described and other variations upon and modifications to the illustrated embodiment are addressed by the following claims.

What is claimed is:

1. A user-interface testing process comprising:
computer-implemented generating of plural display-data representations of a common subject for plural respective user-interface instances executing on plural respective computers;
computer-implemented tracking of said display-data representations for each of said user-interface instances so as to generate respective object-level descriptions of said display-data representations; and
computer-implemented comparing of said object-level descriptions to detect differences between said user-interface instances in their respective display-data representations of said common subject on different ones of said computers.

2. A user-interface testing process as recited in claim 1 further comprising generating a human-readable report describing differences between said display-data representations.

3. A user-interface testing process as recited in claim 2 wherein said report provides for selecting differences to be deleted from said report.

4. A user-interface testing process as recited in claim 1 wherein said computers include virtual machines executing on hardware.

5. A user-interface testing process as recited in claim 1 wherein said user-interface instances belong to different browsers used to view a common site and said display-data representations are representations of that common site.

6. A user-interface testing system comprising:
plural computers for generating plural display-data representations of a common subject for plural respective user-interface instances;
user-interface object capturers for generating object-level descriptions of said display-data representations; and
a difference analyzer for detecting, based on said object-level descriptions, differences between said use-interface instances in their respective display-data representations of said common subject on different ones of said computers.

7. A user-interface testing system as recited in claim 6 further comprising a report generator for presenting said differences in a human-readable report to a user.

8. A user-interface testing system as recited in claim 7 wherein said report generator provides for selecting differences to be deleted from said report.

9. A user-interface testing system as recited in claim 6 wherein said computers include virtual machines executing on hardware.

10. A user-interface testing system as recited in claim 6 wherein said user-interface instances belong to different browsers used to view a common web application, said data representations being based on display data provided by said common web application.

11. A user-interface testing system comprising non-transitory computer-readable storage media encoded with code that, when executed, provides for:
generating plural display-data representations of a common subject for plural respective user-interface instances executing on plural respective computers;
tracking display data for each of said display-data representations so as to generate respective object-level descriptions of display-data representations; and
comparing said object-level descriptions to detect differences between said user-interface instances in their display-data representations of said common subject on different ones of said computers.

12. A user-interface testing system as recited in claim 11 wherein said code further provides for generating a human-readable report describing differences between said representations.

13. A user-interface testing system as recited in claim 12 wherein said report provides for selecting differences to be deleted from said report.

14. A user-interface testing system as recited in claim 11 wherein said computers include virtual machines executing on hardware.

15. A user-interface testing system as recited in claim 11 wherein said user-interface instances belong to different browsers used to view a common web application, said display-data representations being based on display data provided by said common web application.

16. A user-interface testing system as recited in claim 11 further comprising processors for executing said code.

17. A user-interface testing system as recited in claim 16 wherein said code further provides for generating a human-readable report describing differences between application user-interface instances.

18. A user-interface testing system as recited in claim 17 wherein said report provides for selecting differences to be omitted from said report.

19. A user-interface testing system as recited in claim 16 wherein said user-interface instances belong to application instances running on different computers, partitions, or virtual machines.

20. A user-interface testing system as recited in claim 16 wherein said user-interface instances belong to different browsers used to view a common web application.

* * * * *